(No Model.)

I. K. HOLLINGER.
FENCE WIRE TIGHTENER.

No. 515,936. Patented Mar. 6, 1894.

Witnesses:
C. H. Paeder
K. R. Matthews.

Inventor
I. K. Hollinger
By James J. Sheehy
Attorney

THE NATIONAL LITHOGRAPHING COMPANY,
WASHINGTON, D. C.

UNITED STATES PATENT OFFICE.

ISAAC K. HOLLINGER, OF GREENVILLE, OHIO.

FENCE-WIRE TIGHTENER.

SPECIFICATION forming part of Letters Patent No. 515,936, dated March 6, 1894.

Application filed December 23, 1893. Serial No. 494,564. (No model.)

*To all whom it may concern:*

Be it known that I, ISAAC K. HOLLINGER, a citizen of the United States, residing at Greenville, in the county of Darke and State of Ohio, have invented certain new and useful Improvements in Fence-Wire Tighteners; and I do declare the following to be a full, clear, and exact description of the invention, such as will enable others skilled in the art to which it appertains to make and use the same.

My invention relates to improvements in that class of wire stretchers, which are designed to be placed upon the end posts of fences to tighten the wires thereof; and it consists in the peculiar construction, certain novel combinations, and the adaptation of parts hereinafter described and particularly pointed out in the claim appended.

Figure 1:
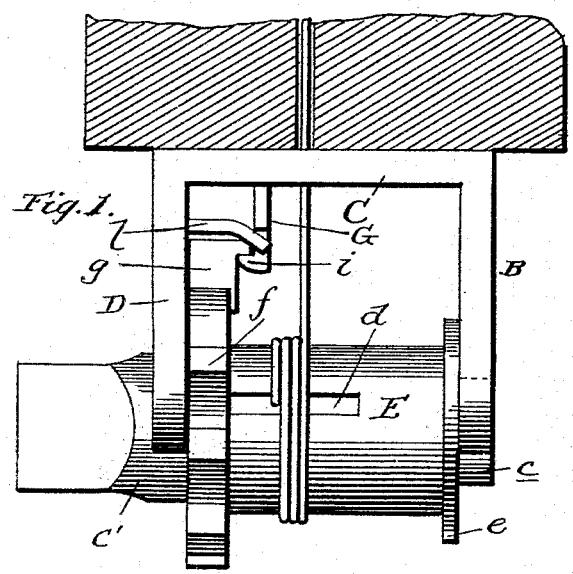
Figure 2:
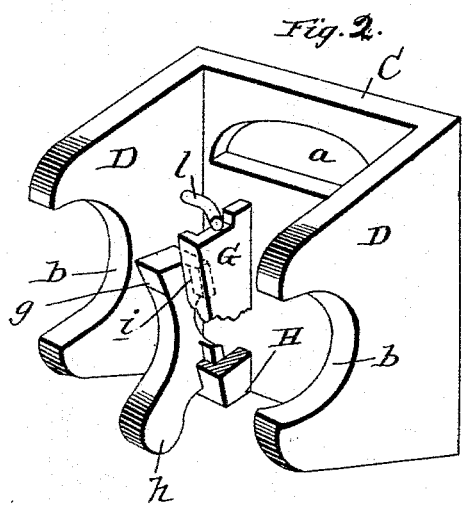
Figure 3:
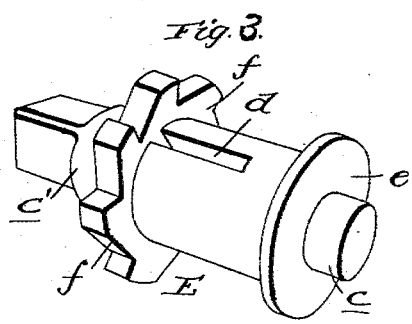
Figure 4:
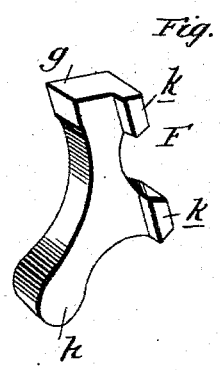

In the accompanying drawings: Figure 1, is a plan view of my stretcher in an operative position upon a post. Fig. 2, is a perspective view of the stretcher with the spool removed. Fig. 3, is a detail perspective view of the spool, and Fig. 4, is a similar view of the pawl.

Referring by letter to said drawings:—A, indicates a fence post or the like: and B, indicates the main frame of my improved stretcher, which may be connected to the post in any approved manner. This frame B, is preferably cast or otherwise formed in one piece, as better shown in Fig. 2, and it comprises the plate C, which is preferably provided with an aperture $a$, for the passage of the wire, and the brackets D, which are provided with bearings $b$, for the trunnions $c, c'$, of the spool E, as shown. The said spool E, which may be turned by a crank or other suitable device, is preferably provided with a slot $d$, to permit of a ready fastening of the wire, and is also provided with a peripheral flange $e$, to keep the wire within proper limits, and with ratchet teeth $f$, which are designed and adapted to be engaged by the gravitating pawl F. This pawl F, has its upper end squared as shown at $g$, so as to engage the ratchet teeth $f$, and it also has its lower portion extended forwardly and downwardly, as shown at $h$ in order to hold the squared end $g$, in engagement with the ratchet teeth.

As better shown in Fig. 2, of the drawings, the pawl F, rests in a casing formed by one of the brackets D, a wall G, which rests parallel with the bracket and is provided with the inwardly directed flange $i$, and the end wall H. The pawl is designed to move loosely in this casing so as to engage the teeth $f$, as before described, but it is prevented from dropping out or becoming displaced by its lateral lugs $k$, which are designed to engage the flange $i$, of the wall G, as better shown in Fig. 2, and the pin or bolt which extends across and closes the upper end of the casing as shown. This pin or bolt $l$, may be and preferably is screwed in or otherwise detachably connected to the bracket D, so that it may be readily removed when it is desired to remove the pawl and replace it with a new one.

In the practice of the invention, the stretcher is secured upon the post as shown in Fig. 1, and the wire is connected to the spool E, by passing it through the slot $d$, or in any other approved manner. The spool is then turned, until the wire is sufficiently taut, when the pawl will automatically assume the position shown in Fig. 1 and will securely hold the spool against casual rotation.

It will be seen from the foregoing description taken with the drawings that my improved stretcher is very cheap, simple and compact; that it may be readily connected to a post or the like, and that it is highly efficient in operation and is capable of withstanding great strain and rough usage which is an important desideratum. It will also be seen that by reason of my improved construction there is no danger of the pawl being displaced either when the spool is in position or when it is removed, since said pawl is confined within the casing described.

Having described my invention, what I claim is—

In a wire stretcher, the combination of a frame comprising a plate, brackets extending forwardly from the plate, the wall G, arranged parallel to one of the brackets and having the inwardly directed flange $i$, the wall H, extending from the lower end of the wall G, to the bracket, and the pin or bolt $l$ connected to the bracket and extending laterally from the same so as to close the upper end of the space between the bracket and the wall G, a spool journaled in the brackets of the frame, and having ratchet teeth, and the pawl F loosely arranged between the wall G, and the bracket and having the lateral lugs $k$ adapted to engage the flange of the wall G, the said pawl being adapted to engage the ratchet teeth of the spool, all substantially as and for the purpose set forth.

In testimony whereof I affix my signature in presence of two witnesses.

ISAAC K. HOLLINGER.

Witnesses:
WM. SCHNAUS,
JOHN SNOUSE.